Figure 1:

United States Patent [19]

Asano et al.

[11] 4,293,533

[45] Oct. 6, 1981

[54] METHOD FOR PRODUCING SOLID CARBON MATERIAL HAVING HIGH FLEXURAL STRENGTH

[75] Inventors: Kiro Asano, Tokyo; Humio Tamura, Koganei; Yushi Nezu, Yokohama; Tsuyoshi Saito; Yoshio Kawai, both of Tokyo, all of Japan

[73] Assignee: Kureha Kagaku Kogyo Kabushiki Kaisha, Tokyo, Japan

[21] Appl. No.: 758,838

[22] Filed: Jan. 12, 1977

Related U.S. Application Data

[63] Continuation of Ser. No. 544,902, Jan. 28, 1975, abandoned.

[30] Foreign Application Priority Data

Jan. 31, 1974 [JP] Japan ............................. 49-12258

[51] Int. Cl.³ ............................................. C01B 31/02
[52] U.S. Cl. .................................. 423/449; 264/29.1; 264/29.2; 423/445; 423/447.1; 423/448
[58] Field of Search ............... 423/447.1, 447.2, 447.4, 423/447.6, 448, 449, 445; 29/29.1, 29.2; 208/6

[56] References Cited

U.S. PATENT DOCUMENTS

| | | | |
|---|---|---|---|
| 3,558,276 | 1/1971 | Otani | 423/449 |
| 3,565,980 | 2/1971 | Otani | 423/449 X |
| 3,839,515 | 10/1974 | Romouacek | 264/29.1 |

FOREIGN PATENT DOCUMENTS

| | | | |
|---|---|---|---|
| 1220482 | 1/1971 | United Kingdom | 423/445 |
| 1307392 | 1/1973 | United Kingdom | 423/445 |

*Primary Examiner*—Edward J. Meros
*Attorney, Agent, or Firm*—Frishauf, Holtz, Goodman & Woodward

[57] ABSTRACT

Solid carbon material having extremely high flexural strength can be produced by introducing a sufficient amount of functional group to satisfy the undernoted general equation into a pitch having a H/C atomic ratio of 0.8 at most, thereby obtaining precursory carbon material; shaping said precursory carbon material into a desired article without using any binding material; and carbonizing or further graphitizing said article; wherein the general equation is $$0.54 = \frac{H}{C} - \frac{f}{100} = R$$

where, H/C is the hydrogen-to-carbon atomic ratio of the pitch, R is a numeral ranging from 0.2 to 0.3, and f is the percent by weight of at least one of oxygen, sulfur and halogen contained in the total functional groups introduced into the precursory carbon material on the basis of the weight thereof.

1 Claim, 1 Drawing Figure

10μ

METHOD FOR PRODUCING SOLID CARBON MATERIAL HAVING HIGH FLEXURAL STRENGTH

This is a continuation, of application Ser. No. 544,902, filed Jan. 28, 1975, now abandoned.

This invention relates to a solid carbon material, and particularly to a solid carbon material having remarkably high flexural strength.

Heretofore, most solid carbon materials have been manufactured by molding a mixture of pulverized raw carbonaceous material such as petroleum coke powders and pitch as a binder into an article, followed by carbonizing or further graphitizing said article. However, the mechanical strength of the product is notably low as a rule, because of the decomposition of the binding material during carbonization and graphitization thereby deteriorating the inner-structure of the products. If coke powders could be solidified by sintering as in powder metallurgy without using any binding material, then the product would have an exceeding increased mechanical strength. However, no commercially available petroleum coke has sintering property in itself, and so some quantity of binding material is always necessary to be used.

Another method proposed to date for manufacturing a solid carbon material without using a binding material comprises densifying light pitch to obtain spherulites thereof, separating said spherulites from the matrix by solvent extraction, press-molding the spherulites into a shaped article, and carbonizing or further graphitizing said article. According to this method, it is possible to obtain a solid carbon material of high density without using any binder. However, spherulites are obtained from the light pitch in a very low yield and are difficult to separate from the matrix. Moreover, some cracks are liable to grow in the carbonized or graphitized globulites. Therefore, this method has never been practically adopted in the art.

An object of the present invention is to produce. solid carbon material having extremely high mechanical strength and low porosity from pitch without using any binder or spherulite.

This object can be attained by the method of this invention which comprises introducing a sufficient amount of a functional group into a raw pitch which has a maximum atomic ratio of hydrogen to carbon represented by H/C, of 0.8 to satisfy the undernoted general equation in order to obtain a precursory carbon material; shaping said precursory carbon material into an article without using any binding material; and carbonizing said article at a temperature of at least 1000° C. or, if necessary, further graphitizing the carbonized article at a temperature of from 2000° to 3000° C.; the general equation is represented by $$0.54 \times \frac{H}{C} - \frac{f}{100} = R \quad (1)$$

where: H/C is the hydrogen-to-carbon atomic ratio of the pitch, R is an almost constant numeral ranging from 0.2 to 0.3, and f is the weight percent of at least one of oxygen, sulfur and halogen contained in the functional group introduced into the precursory carbon material based on the weight of said material.

The present invention will best be understood and appreciated from the following description of the process taken in connection with the accompanying drawing in which:

FIG. 1 is a microscopic photograph showing part of the sectional surface of solid carbon material prepared from a mixture of spherulites of pitch and the precursory carbon material of this invention.

The above-mentioned precursory carbon material of this invention can be formed into any shape, using no binder, and solidified due to its own sintering property by a carbonizing process at a temperature of at least 1000° C. In this carbonization step, cracks or blow holes do not grow in the precursory carbon material because of absence of the binder. Therefore, the carbonized or graphitized dense carbon material has an exceedingly high flexural strength of at least 900 kg/cm² and an exceedingly low effective porosity of 7% at most, whereas commercially available solid carbon material has as low flexural strength as about 200 to 300 kg/cm² and effective porosity of about 20%. These advantageous features of the solid carbon product prepared by the method of the invention originate from the absence of any crack or blow hole in said carbon material.

The raw pitch is prepared from coal tar, petroleum tar, ethylene bottom oil or asphalt obtained by various process such as distillation, polymerization or condensation under heating, extraction, polymerization and condensation.

The functional groups used in this invention are defined to contain atom or atoms of oxygen, sulfur or halogen as the main element, for examples, guinone group, ether linkage, lactone linkage, carboxyl group, hydroxyl group, ester linkage, nitro group, thiol group, sulfide linkage, sulfoxide linkage and halogen group. Though the action of these functional groups is difficult to define clearly, they seem to have two functions of curing the densified raw pitch and concurrently restraining the growth of stratified cracks therein during carbonization as is generally observed as the common characteristic nature of carbonaceous material such as pitch and its spherulites.

The general equation (1) was experimentally determined from the relation between the atomic ratio H/C in raw pitch and the amount of functional group introduced therein. Though the coefficient of 0.54 in the equation (1) varied somewhat depending on the conditions of experiments, yet the coefficient was chosen to be 0.54 as far as the pitch used has an atomic ratio H/C falling within the ranges defined by this invention.

Precursory carbon material having a larger value of R than 0.3 foams during carbonization. On the other hand, a similar material having a smaller value of R than 0.2 can not be fully sintered, resulting in the failure to obtain the desired carbon material of high mechanical strength.

There are several practical means to introduce the functional group into the pitch, such as a wet method using a water solution of nitric acid, sulfuric acid, mixed acid thereof, hypochlorous acid or ferric chloride, a dry method using chlorine gas, air, oxygen gas or sulfur vapor, and a reaction carried out by a solid reagent of sulfur, ammonium nitrate, ammonium persulphate or ferric chloride.

A solid pitch is used as a main raw material. Further, in order to facilitate the diffusion of reagents producing functional groups into the pitch, pitch articles or a pitch film having a mean diameter or a pitch film having thickness of less than 100 microns, preferably less than 50 microns, may be used. The shape of a pitch used as the raw material may be coarse-powdery, cylindrical, fibrous, filmy, spherical, tubular or breathable block type.

The precursory carbon material may take a suitable form corresponding to the use of final carbon material. For example, a powdery precursor is suitable for the final carbon material of high density, and a fibrous precursor is qualified for the final product having high porosity.

The precursory carbon material may be shaped by the ordinary press-mold method even at room temperature. However, any other method can also be used, such as the pouring method using a medium of water. Further, it is possible to add an amount of an organic solvent having a higher boiling point than 150° C., such as polyethylene grycol and tarry oil, to the precursory carbon material in order to facilitate its shaping.

The calcination of the shaped precursory material is carried out in an inactive atmosphere or in a coke breeze bed. The rate at which calcination temperature is raised is determined according to the form of precursory carbon material used.

As mentioned before, a binder need not be added to the precursory carbon material. The reason is that, when calcined, the molded precursory carbon material is firmly solidified due to the strong binding force of its own particles. Further, a solid carbon product of high density or that of high porosity and low bulk density can be freely obtained simply by controlling the form of precursory carbon material and the density with which said material is packed in a press-mold.

Furthermore, a carbon product of high graphitizability can be provided by adding a functional group containing a smaller amount of total oxygen than 5 percent by weight to the pitch used as the raw material whose H/C ratio is less than 0.6, or a functional group containing a smaller amount of sulfur than 10 percent by weight to the pitch whose H/C ratio is less than 0.7.

On the other hand, a final carbon material having low graphitizability can be obtained using a raw pitch whose H/C ratio is in the range of from 0.6 to 0.8 and introducing a functional group containing more than 5 weight percent of total oxygen or more than 10 weight percent of total sulfur thereinto. The larger the H/C ratio or the amount of a functional group added, the harder the carbon product obtained. Thoughtreatedathightemperature, a carbon product of low graphitizability presents a glass-like cutaway surface.

A mixture of raw pitch having an atomic ratio H/C of 0.8 at most and a specific organic substance pitch, coal or thermosetting resins may be used as a modification of the precursory carbon material of this invention. The above-mentioned specific organic substance should also have an atomic ratio H/C of 0.8 at most and a fixed carbon of 55% at most, and contain a functional group similar to the original invention mainly consisting of oxygen, sulfur or halogens whose elementary analysis presents a value of 5 percent at most. The mixing ratio of the raw pitch and the specific organic substance should be determined so as to satisfy the equation (1), provided that the value of H/C represents that of the raw pitch and the value of f is based on the weight of mixture.

The particles of this precursory carbon material may take various forms such as powdery, granular, spherical, cylindrical, fibrous, pillar-like, etc. The mixing of the raw pitch and the special organic substance may be carried out mechanically or by stirring in a medium of water on an organic solvent.

The solid carbon material obtained by the method of this invention is very effective to prepare a high grade rubbing material which is used as mechanical seals, brakes of aeroplanes, apex seals, bearings, brushes and the like, and also as various kinds of electrode such as discharging electrode, carbon electrode for fuel cells, electrode for electro-plating, metal-sintering electrode, arc electrode, electrode for electrolysis, nipple for steel making, etc., and further as many other articles such as dies for sintering, continuous nozzles, jigs for seimconductors, carbon crucibles, graphite materials for nuclear power apparatus, nonpermeable carbon materials, mechanical carbon materials, medical carbon materials, etc.

The following examples illustrate the practice of the present invention.

EXAMPLE 1

Various forms of pitch whose atomic ratio of H/C varied from 0.8 to 0.5 were prepared by densifying an ethylene bottom oil at a temperature of from 350° to 420° C. The pitch was pulverized to a finer size than 200(74u) mesh. Oxygen atoms were introduced into the pulverized pitch by heating them in the air to a maximum temperature of 300° C. in increments of 30° to 100° C. per hour with care taken to prevent the particles from being melted, obtaining an R value of 0.3 to 0.2.

The characteristics of various forms of raw pitch and precursory carbon materials obtained are shown in Table 1.

In Table 1, an amount of a matter insoluble in quinoline was determined by dissolving one gram of a sample in 150 grams of quinoline at 40° C. for 12 hours, and separating the insoluble matter form the solution by a glass filter.

TABLE 1

| | Raw Pitch | | | Precursory carbon material | | | |
|---|---|---|---|---|---|---|---|
| Experiment No. | Atomic ratio H/C | Softening point °C. | Oxygen content wt. % | Atomic ratio H/C | Value of R | Fixed carbon wt. % | Quinoline insoluble matter wt. % |
| 1 | 0.800 | 130 | 15.00 | 0.580 | 0.28 | 74.0 | 6.8 |
| 2 | 0.800 | 130 | 22.14 | 0.450 | 0.21 | 69.0 | 30.5 |
| 3 | 0.721 | 170 | 10.72 | 0.590 | 0.28 | 75.8 | 5.9 |
| 4 | 0.721 | 170 | 13.66 | 0.566 | 0.25 | 75.0 | 7.8 |
| 5 | 0.721 | 170 | 16.00 | 0.515 | 0.22 | 73.8 | 19.0 |
| 6 | 0.632 | 300 | 3.60 | 0.603 | 0.30 | 77.5 | 33.7 |
| 7 | 0.632 | 300 | 6.17 | 0.542 | 0.28 | 80.8 | 73.9 |
| 8 | 0.563 | at least 450 | 2.48 | 0.534 | 0.28 | 86.0 | 91.0 |
| 9 | 0.522 | at least 480 | 3.50 | 0.491 | 0.24 | 88.2 | 92.3 |

Carbon articles having high flexural strength were produced using the precursory carbon materials shown in Table 1. These precursory carbon materials were pulverized into powders having particle size of 10 microns, at most, followed by press-molding into disks of 90 mm in diameter and 50 mm high under a pressure of from 500 to 2,000 kg/cm² at room temperature. Then, the disks were carbonized in a coke breeze bed at maximum temperature of 1,000° C. for 30 minutes by attaining said level in increments of 15° C. per minute, followed by graphitization of the carbonized disks at 2800° C. in nitrogen gas atmosphere. The characteristics of carbonized disks and graphitized disks obtained are shown in Table 2. The flexural strength given in Table 2 was measured according to ASTM-D790, and the effective porosity was measured by the water-impregnating method.

gen atoms into raw pitch having an H/C ratio of less then 0.6, carbonized or graphitized carbon products having extremely high density could be obtained. For example, it was found that the graphitized disk of No. 8 in Table 2 obtained from the precursory carbon material of No. 8 in Table 1 had a spacing (d002) of 3.370 Å, and similarly that of No. 9 had a spacing (d002) of 3.360 Å, as measured by an X-ray analysis.

EXAMPLE 2

Several kinds of pitch having an H/C ratio of 0.8 at most, were prepared from different kinds of raw materials. Into these pitches oxygen was introduced to obtain precursory carbon materials whose R values were in the range of from 0.2 to 0.3 as in Example 1. The characteristics of the raw pitch samples and precursory carbon materials used are shown in Table 3.

TABLE 2

| Experiment No. | Molding Pressure kg/cm² | Carbonized disk | | | Graphitized disk | | | | |
|---|---|---|---|---|---|---|---|---|---|
| | | Bulk density g/cm³ | Effective porosity vol. % | Flexural strength kg/cm² | Bulk density g/cm³ | Effective porosity vol. % | Flexural strength kg/cm² | Shore hardness Hs | Electric resistivity x10⁻⁴Ωcm |
| 1 | 500 | 1.49 | 3.8 | 1,230 | 1.55 | 0.5 | 1,220 | 130 | — |
| 2 | 700 | 1.49 | 3.8 | 1,220 | 1.55 | 0.5 | 1,200 | 130 | — |
| 3 | 700 | 1.53 | 3.5 | 1,300 | 1.61 | 1.0 | 1,300 | 130 | 45.0 |
| 4 | 1,000 | 1.50 | 5.2 | 1,200 | 1.59 | 2.3 | 1,150 | 130 | — |
| 5 | 1,500 | 1.49 | 6.0 | 1,050 | 1.58 | 3.0 | 900 | 120 | — |
| 6 | 1,500 | 1.55 | 5.8 | 1,200 | 1.70 | 4.0 | 1,130 | 110 | 30.0 |
| 7 | 2,000 | 1.53 | 5.9 | 1,200 | 1.69 | 4.0 | 1,100 | 110 | — |
| 8 | 1,000 | 1.64 | 5.0 | 1,300 | 2.06 | 4.3 | 1,200 | 90 | 15.0 |
| 9 | 1,300 | 1.60 | 6.0 | 1,150 | 2.00 | 5.8 | 1,000 | 80 | 18.0 |

TABLE 3

| Experiment No. | Raw pitch | | | Percursory carbon material | | | |
|---|---|---|---|---|---|---|---|
| | Raw material | Ratio of H/C | Softening point °C. | Oxygen content wt. % | Value of R | Fixed carbon wt. % | Quinoline insoluble matter wt. % |
| 11 | Coal tar | 0.520 | 100 | 5.29 | 0.23 | 79.24 | 89.0 |
| 12 | Coal tar | 0.475 | 380 | 3.50 | 0.22 | 81.21 | 70.5 |
| 13 | Coal tar | 0.420 | 460 | 2.31 | 0.20 | 83.5 | 95.6 |
| 14 | Petroleum cracked tar | 0.530 | 170 | 5.55 | 0.23 | 86.0 | 35.9 |
| 15 | Petroleum cracked tar | 0.498 | 300 | 5.85 | 0.21 | 87.7 | 65.3 |
| 16 | Petroleum cracked tar | 0.450 | more than 400 | 2.50 | 0.22 | 88.5 | 89.0 |
| 17 | Asphalt | 0.800 | 150 | 2.00 | 0.23 | 72.0 | 70.0 |
| 18 | Asphalt | 0.600 | 300 | 6.0 | 0.28 | 85.0 | 86.0 |
| 19 | Asphalt | 0.560 | more than 400 | 2.3 | 0.28 | 90.0 | 95.0 |

As obvious from Table 2, the carbonized or graphitized articles obtained from the precursory carbon materials of this invention present a much lower effective porosity and higher flexural strength than customary carbon products generally having a flexural strength of about 250 kg/cm², bulk density of about 1.75, effective porosity of about 28 volume percent and specific electric resistance of about 7.5×10⁻⁴ ohm·cm.

It deserves notice, as seen from Tables 1 and 2, that, when the precursory carbon material which was prepared by introducing less than 5 weight percent of oxy- Carbon articles having high flexural strength were produced using the precursory carbon materials shown in Table 3. These precursory carbon materials were pulverized into powders having particle sizes of 10 microns at most, followed by press-molding into disks of the same size as in Example 1 under a pressure of from 700 to 2,000 kg/cm² at room temperature. Then the disks were carbonized and graphitized in the same manner as in Example 1. The characteristics of carbonized disks and graphitized disks obtained are shown in Table 4.

TABLE 4

| Experiment No. | Molding pressure kg/cm² | Carbonized disk | | | Graphitized disk | | | |
|---|---|---|---|---|---|---|---|---|
| | | Bulk density g/cm³ | Effective porosity vol. % | Flexural strength kg/cm² | Bulk density g/cm³ | Effective porosity vol. % | Flexural strength kg/cm² | Shore hardness Hs |
| 11 | 700 | 1.48 | 6.0 | 1,180 | 1.61 | 4.2 | 1,050 | 129 |
| 12 | 700 | 1.51 | 5.1 | 1,210 | 1.85 | 5.0 | 1,000 | 118 |
| 13 | 1,300 | 1.55 | 5.3 | 1,190 | 1.90 | 5.5 | 990 | 80 |

TABLE 4-continued

|  |  | Carbonized disk | | | Graphitized disk | | | |
| --- | --- | --- | --- | --- | --- | --- | --- | --- |
| Experiment No. | Molding pressure kg/cm² | Bulk density g/cm³ | Effective porosity vol. % | Flexural strength kg/cm² | Bulk density g/cm³ | Effective porosity vol. % | Flexural strength kg/cm² | Shore hardness Hs |
| 14 | 700 | 1.54 | 4.0 | 1,300 | 1.69 | 0.5 | 1,290 | 130 |
| 15 | 1,300 | 1.58 | 3.8 | 1,350 | 1.90 | 3.1 | 1,300 | 110 |
| 16 | 2,000 | 1.63 | 6.0 | 1,320 | 2.00 | 5.3 | 1,300 | 90 |
| 17 | 700 | 1.49 | 7.1 | 1,150 | 1.52 | 3.0 | 1,100 | 125 |
| 18 | 1,300 | 1.48 | 6.2 | 1,000 | 1.70 | 5.0 | 900 | 100 |
| 19 | 2,000 | 1.56 | 5.8 | 1,050 | 1.80 | 3.9 | 950 | 90 |

As obvious from Table 4, the carbonized or graphitized articles obtained from the precursory carbon materials of this invention present extremely low effective porosity and high flexural strength, like those in Example 1. Further, the smaller H/C ratio, lower oxygen content and higher graphitizability of carbonized material were shown to provide the higher bulk density of product, as in the case of using ethylene bottom oil as a raw material.

EXAMPLE 3

Several kinds of pitch having an H/C ratio of 0.8 at most, were prepared by densifying ethylene bottom oil and coal tar, respectively, at 300° C. with simultaneous flowing of air. The pitches obtained are collectively indicated as "A-substance".

On the other hand, pitch samples having a H/C ratio of 0.51 and 170° C. softening point were prepared by cracking a tar which was obtained in distilling a petroleum crude oil at a high temperature. The pitch samples were oxidized by air according to the method described in Example 1 to obtain an oxygen-containing organic substance (indicated as "B-substance" in Table 5 below), containing at least 5 weight percent of oxygen and at least 60% of fixed carbon.

The precursory carbon materials were prepared by mixing an A-substance and a B-substance so as to cause the value of R to be in the range of from 0.2 to 0.3. Then the precursory carbon materials thus obtained were pulverized to obtain powders having a particle size of 10 microns at most.

The characteristics of the A- and B-substances and the precursory carbon materials are shown in Table 5.

TABLE 5

|  | A-substance | | | B-substance | | | Precursory carbon material | |
| --- | --- | --- | --- | --- | --- | --- | --- | --- |
| Experiment No. | Raw pitch | Ratio of H/C | Softening point °C. | Oxygen content wt. % | Ratio of H/C | Fixed carbon wt. % | Mixing ratio of A based on B (wt. %) | Value of R |
| 21 | From ethylene bottom oil | 0.800 | 130 | 25.0 | 0.300 | 70.0 | 70 | 0.26 |
| 22 | From ethylene bottom oil | 0.712 | 170 | 25.0 | 0.300 | 70.0 | 50 | 0.25 |
| 23 | From ethylene bottom oil | 0.632 | 300 | 9.98 | 0.348 | 86.0 | 40 | 0.30 |
| 24 | From ethylene bottom oil | 0.583 | 420 | 6.88 | 0.453 | 86.4 | 30 | 0.29 |
| 25 | From coal tar | 0.550 | 270 | 9.98 | 0.348 | 86.0 | 70 | 0.23 |
| 26 | From coal tar | 0.473 | 350 | 6.88 | 0.453 | 86.6 | 35 | 0.23 |
| 27 | From coal tar | 0.450 | 420 | 6.88 | 0.453 | 86.6 | 30 | 0.22 |

The precursory carbon materials were pulverized into powders having a particle size of 10 microns at most, followed by press-molding, carbonizing and graphitizing in the same manner as in Example 1. The characteristics of carbonized disks and graphitized disks obtained are shown in Table 6.

TABLE 6

|  |  | Carbonized disk | | | Graphitized disk | | | |
| --- | --- | --- | --- | --- | --- | --- | --- | --- |
| Experiment No. | Molding pressure kg/cm² | Bulk density g/cm³ | Effective porosity vol. % | Flexural strength kg/cm² | Bulk density g/cm³ | Effective porosity vol. % | Flexural strength kg/cm² | Shore hardness Hs |
| 21 | 700 | 1.50 | 4.7 | 1,400 | 1.59 | 1.0 | 1,380 | 131 |
| 22 | 1,000 | 1.52 | 4.5 | 1,450 | 1.63 | 1.5 | 1,430 | 130 |
| 23 | 1,500 | 1.58 | 5.3 | 1,480 | 1.85 | 1.9 | 1,400 | 99 |
| 24 | 1,500 | 1.70 | 4.0 | 1,500 | 2.03 | 2.0 | 1,490 | 88 |
| 25 | 500 | 1.48 | 5.3 | 1,320 | 1.53 | 1.3 | 1,290 | 129 |
| 26 | 700 | 1.52 | 4.5 | 1,390 | 1.80 | 4.0 | 1,350 | 123 |
| 27 | 1,000 | 1.61 | 5.9 | 1,360 | 1.89 | 6.3 | 1,300 | 82 |

As obvious from Table 6, the carbonized and graphitized articles obtained from the precursory carbon materials of this invention, respectively, present extremely high flexural strength. Further, the lower the H/C ratio and the smaller the oxygen content, the denser the article obtained as in Examples 1 and 2.

EXAMPLE 4

A pitch sample whose H/C ratio and softening point were 0.71 and 170° C., respectively, was prepared by densifying ethylene bottom oil. This pitch sample was melt-spun at 350° C. to obtain pitch fibers 14 microns in diameter. The fibers were heat treated in the air by raising temperature up to 230° C. in increments of 30° C. per hour to obtain a fibrous precursory carbon material whose oxygen content and H/C ratio were 10.5 weight % and 0.55, respectively.

Part of the above-mentioned fibrous precursory carbon material was pulverized into powders having a particle size of 10 microns at most, followed by press-molding, carbonizing and graphitizing in the same manner as in Example 1. The characteristics of the carbonized disk and the graphitized disk obtained are shown in Table 7.

TABLE 7

| Sample | Bulk density g/cm³ | Effective porosity vol. % | Flexural strength kg/cm² | Shore hardness Hs |
|---|---|---|---|---|
| Carbonized | 1.51 | 4.0 | 1,450 | 130 |
| Graphitized | 1.60 | 0.2 | 1,490 | 130 |

As seen from Table 7, the graphitized sample rather presented a higher flexural strength than the carbonized sample conversely to Examples 1 to 3.

EXAMPLE 5

Part of the fibrous precursory carbon material obtained in Example 4 was cut as in interesting special case, in lengths of from 0.1 to 0.1 mm. Twenty weight parts of ethylene glycol having a mean molecular weight of 400, and one hundred weight parts of water were mixed with one hundred weight parts of the above-mentioned cut substance. The mixture was poured into a graphite box 200 mm long, 200 mm wide and 100 mm high to a level of 50 mm. The mixture contained in the graphite box was heated by raising the temperature thereof up to 200° C. in increments of 10° C. per hour in a nitrogen gas atmosphere, followed by carbonizing at a temperature of 1000° C. attained in increments of 30° C. per hour, to obtain a porous rigid article 150 mm long, 149 mm wide and 30 mm high. Further, part of this rigid article was graphitized at 2800° C. The characteristics of the carbonized article and the graphitized article are shown in Table 8.

TABLE 8

| Sample | Bulk density g/cm³ | Effective porosity vol. % | Flexural strength kg/cm² | Specific Flexural strength $\left(\frac{F.S.}{B.D.}\right)$ cm |
|---|---|---|---|---|
| Carbonized article | 0.9 | 44.0 | 310 | $3.44 \times 10^5$ |
| Graphitized article | 1.00 | 46.0 | 320 | $3.20 \times 10^5$ |
| Control: commercially available graphitized article | from 1.78 to 1.80 | from 18 to 22 | from 200 to 300 | from $1.12 \times 10^5$ to $1.67 \times 10^5$ |

Table 8 shows that the carbon articles obtained in this example presented a higher flexural strength than commercially available graphitized carbon articles in spite of the low bulk density. This originates with the fact that the fibers of precursory carbon material firmly cohere with each other at their contact points.

EXAMPLE 6

A pitch sample having a softening point of 190° C. and an H/C ratio of 0.51 was prepared by spraying hot steam for densification of the tar obtained in high temperature cracking of crude petroleum. Thirty weight parts of naphthalene were mixed with one hundred weight parts of the pitch obtained. This mixture was charged into an autoclave together with a plentiful amount of 3% water solution of polyvinyl alchol as a dispersing agent, followed by stirring vigorously at 140° C., obtaining beads having a mean diameter of 400 microns. After being dried at a temperature of from 40° to 80° C. under reduced pressure to remove the water and naphthalene, the beads obtained were heated by raising the temperature up to 240° C. in increments of 30° C. per hour, providing bead-shaped precursory carbon material containing 5.5 percent by weight of oxygen and 86.0 percent of fixed carbon.

Disks 90 mm in diameter and 20 mm thick were prepared from the above-mentioned beads of precursory carbon material by press-molding under a pressure of 2000 kg/cm², followed by carbonizing and graphitizing in the same manner as in Example 1. The characteristics of the carbonized disk and the graphitized disk are shown in Table 9.

TABLE 9

| Sample | Bulk density g/cm³ | Effective porosity vol. % | Flexural strength kg/cm² | Electric resistivity $\times 10^{-4} \Omega cm$ |
|---|---|---|---|---|
| Carbonized disk | 1.59 | 4.5 | 1,290 | 70 |
| Graphitized disk | 1.76 | 1.0 | 1,250 | 20 |

EXAMPLE 7

Several pitch samples having different H/C atomic ratios were prepared by heat-treating the ethylene bottom oil at different temperatures between 350° and 450° C. under atmospheric pressure, and then pulverized. Each pulverized pitch sample was mixed with a proper amount of sulfur powder together with an amount of methyl alcohol in compliance with the atomic H/C ratio of the pitch. The mixture was heated up to 230° C. in an inactive atmosphere, and allowed to stand at this temperature for one hour, thereby obtaining a sample of sulfurized precursory carbon material. The sulfurized material was again pulverized into powder having a particle size of 10 microns at most, and then press-molded into disks 90 mm in diameter and 50 mm thick under a pressure of 500 kg/cm² at a room temperature.

The press-molded disks were heat-treated by raising the temperature up to 1000° C. in increments of 10° C. per hour in a coke breeze bed to obtain carbonized articles. Some of the articles wer further heated up to 2800° C. for graphitization. The characteristics of raw pitch samples and the precursory carbon materials are shown in Table 10, and those of the carbonized disks and the graphitized disks are shown in Table 11.

TABLE 10

| Experiment No. | Raw pitch | | Precursory carbon material | | | Molding pressure kg/cm² |
|---|---|---|---|---|---|---|
| | Atomic Ratio H/C | Softening point °C | Sulfur content vol. % | Fixed Value carbon wt. % | of R | |
| 31 | 0.80 | 130 | 15.0 | 76.0 | 0.28 | 500 |
| 32 | 0.71 | 170 | 10.0 | 78.8 | 0.28 | 1,000 |
| 33 | 0.63 | 350 | 4.5 | 81.5 | 0.29 | 1,500 |

TABLE 10-continued

| | Raw pitch | | Precursory carbon material | | Molding pressure kg/cm² |
|---|---|---|---|---|---|
| Experiment No. | Atomic Ratio H/C | Softening point °C. | Sulfur content vol. % | Fixed Value carbon of R wt. % | |
| 34 | 0.56 | 450 | 3.0 | 84.0  0.27 | 1,500 |

TABLE 11

| | Carbonized disk | | | Graphitized disk | | | |
|---|---|---|---|---|---|---|---|
| Experiment No. | Bulk density g/cm³ | Effective porosity vol. % | Flexural strength kg/cm² | Bulk density g/cm³ | Effective porosity vol. % | Flexural strength kg/cm² | Electric resistivity × 10⁻⁴Ωcm |
| 31 | 1.50 | 3.5 | 1,100 | 1.63 | 2.0 | 1,200 | 35 |
| 32 | 1.52 | 3.0 | 1,300 | 1.80 | 1.9 | 1,200 | 28 |
| 33 | 1.59 | 2.9 | 1,280 | 1.85 | 1.5 | 1,230 | 20 |
| 34 | 1.63 | 2.8 | 1,290 | 2.00 | 1.5 | 1,210 | 15 |

EXAMPLE 8

Each of the pulverized pitches in Example 7 was treated by air containing 10 volume percent of chlorine gas at room temperature and atmospheric pressure for ten hours to obtain a chlorinated precursory carbon material. Carbonized and graphitized disks were obtained in the same manner as described in Example 7. The characteristics of the precursory carbon materials and disks prepared therefrom are shown in Tables 12 and 13.

TABLE 12

| | Raw pitch | | Precursory carbon material | | | Molding pressure kg/cm² |
|---|---|---|---|---|---|---|
| Experiment No. | Atomic ratio H/C | Softening point °C. | Chlorine content vol. % | Fixed carbon wt. % | Value of R | |
| 41 | 0.80 | 130 | 20.0 | 73.0 | 0.23 | 700 |
| 42 | 0.71 | 170 | 13.0 | 78.0 | 0.26 | 1000 |
| 43 | 0.63 | 350 | 6.0 | 80.0 | 0.28 | 1500 |
| 44 | 0.56 | 450 | 5.0 | 84.0 | 0.25 | 2000 |

TABLE 13

| | Carbonized disk | | | Graphitized disk | | | |
|---|---|---|---|---|---|---|---|
| Experiment No. | Bulk density g/cm³ | Effective porosity vol. % | Flexural strength kg/cm² | Bulk density g/cm³ | Effective porosity vol. % | Flexural strength kg/cm² | Electric resistivity × 10⁻⁴Ωcm |
| 41 | 1.49 | 4.5 | 1000 | 1.60 | 3.1 | 950 | 38 |
| 42 | 1.51 | 3.0 | 1240 | 1.69 | 2.5 | 1100 | 29 |
| 43 | 1.58 | 3.1 | 1230 | 1.80 | 2.0 | 1200 | 20 |
| 44 | 1.60 | 3.1 | 1270 | 1.95 | 1.9 | 1230 | 18 |

EXAMPLE 9

A pitch sample whose H/C atomic ratio and softening point were 0.50 and 150° C. respectively, was prepared by densifying raw coal pitch having a softening point of 43° C. by blowing air thereinto at 200° C. Five hundred grams of the densified pitch and five liters of water solution containing 5 percent by weight of hypochlorous acid were charged into a corrosion-resistive ball mill of ten-liter capacity. Pulverization and oxidation of the pitch were simultaneously carried out for 24 hours by the rotation of said ball mill. The pulverized and oxidized pitch was dried at 100° C., followed by press-molding, carbonization and graphitization in the same way as in Example 7.

The molding pressure was 700 kg/cm². The bulk density, effective porosity and flexural strength of the carbonized disk were 1.48 g/cm³, 7.2 volume % and 930 kg/cm², respectively. The bulk density, effective porosity, flexural strength and electric resistivity of the graphitized disk were 1.68 g/cm³, 5.1 volume %, 910 kg/cm² and 28×10⁻⁴ ohm·cm, respectively.

EXAMPLE 10

The following experiment was carried out in order to examine the difference between the construction of carbonized material of this invention and that of carbonized material derived from spherulites of densified pitch. The spherulites of densified pitch were prepared by heat-treating coal pitch at 450° C., followed by separating soluble matter using quinoline as a solvent. Five weight parts of the spherulites obtained were mixed with one hundred weight parts of the precursory carbon material of this invention, and the mixture was press-molded at room temperature and a pressure of 1000 kg/cm² to obtain a sample article. This article was heat-treated for carbonization by raising the temperature up to 1000° C. in increments of 5° C. per hour in an inactive atmosphere. The figure attached is part of a microscopic photograph showing the sectional surface of the carbonized article. As obvious from the photograph, the local portions consisting of spherulites contain some cracks, whereas the surrounding portions formed of the precursory carbon material contain no cracks.

What we claim is:

1. In a method for producing solid carbon material having a high bending strength and a low porosity which comprises preparing a precursory carbon material having a hydrogen-to-carbon ratio of from 0.4 to 0.6 by the sequential steps: introducing functional groups containing oxygen into a pitch used as a raw material having a maximum hydrogen-to-carbon atomic ratio of 0.8; shaping said precursory carbon material into a desired article without using any binding material; and carbonizing and graphitizing said article after said shaping in an inert atmosphere; the improvement comprising so introducing said functional groups into the pitch so as to satisfy the following equation, $$0.54 = \frac{H}{C} - \frac{f}{100} = R$$

where H/C is the hydrogen-to-carbon atomic ratio of the said pitch, R is a value ranging from 0.2 to 0.3, and f is the percent by weight oxygen introduced into the precursory carbon material on the basis of the weight thereof, whereby the said solid carbon material has a maximum effective porosity of 7 percent and a bending strength of at least 900 kg/cm².

* * * * *